United States Patent [19]

Brown

[11] Patent Number: 4,508,309
[45] Date of Patent: Apr. 2, 1985

[54] FAST THERMAL RESPONSE MOLD
[75] Inventor: Robert A. Brown, Mattapoisett, Mass.
[73] Assignee: Acushnet Company, New Bedford, Mass.
[21] Appl. No.: 387,956
[22] Filed: Jun. 14, 1982
[51] Int. Cl.³ ............................................. B22D 27/04
[52] U.S. Cl. ..................... 249/81; 249/119; 425/407; 425/DIG. 110
[58] Field of Search ............... 425/407, 414, 526, 547, 425/548, 552, DIG. 110; 249/119, 79, 81; 264/328.16

[56] References Cited
U.S. PATENT DOCUMENTS

| | | | |
|---|---|---|---|
| 422,221 | 2/1890 | Jayne | 249/81 |
| 528,034 | 10/1894 | Schon | 249/79 |
| 1,049,688 | 1/1913 | Eggers | 425/395 |
| 1,407,682 | 2/1922 | Schavoir | 249/119 |
| 1,505,816 | 8/1924 | Steele | 249/119 |
| 1,595,409 | 8/1926 | Kerr | 425/395 |
| 4,264,293 | 4/1981 | Rourke | 425/407 |
| 4,269,586 | 5/1981 | Ronayne | 425/407 |

Primary Examiner—Jay H. Woo
Assistant Examiner—James C. Housel
Attorney, Agent, or Firm—Lucas & Just

[57] ABSTRACT

An improved mold plate for the compression molding of rubber objects and in particular golf balls and parts thereof is disclosed wherein the mold plate is comprised of replaceable half molds, a mold frame, and has a method of controlling the flow of a thermal medium. The flow of the thermal medium is annular to the half molds and in direct contact with the half molds.

14 Claims, 3 Drawing Figures

FAST THERMAL RESPONSE MOLD

The present invention relates to molds and, in particular, relates to molds for compression molding operations wherein a plurality of molds are retained in a mold frame.

In the compression molding of items such as golf balls, the final molding of the golf balls with the dimples therein is accomplished in a mold assembly comprising a pair of mold plates each of which comprises a plurality of individual molds or mold cups within a mold frame. The mold frame has openings for receiving the individual molds. In this way individual molds can be replaced if they become damaged or worn out without replacing the entire mold assembly.

As is well known in the art, in the manufacture of golf balls by compression molding, golf ball half shells are placed about a core, the core being either a wound core or a homogeneous unitary core. The cover stock from which the golf ball half shells are made is typically either balata, a natural occurring resin, or Surlyn, an ionomeric resin available from DuPont. In either case, after the golf ball sub-assembly comprising the half shells and the core is placed in the compression molding press, each individual mold must be heated in order to melt the cover stock so that it flows evenly about the core. After the cover stock has been molded about the core, the mold must then be cooled so that it in turn cools the cover stock to solidify it before the mold is reopened.

In accordance with standard compression molding techniques used today in the manufacture of golf balls, the mold frame has one or more channels running between adjacent rows of molds. Heating or cooling liquid as required, is passed through these channels in serpentine fashion. This results in a change in the temperature of the mold frame which in turn heats or cools the individual molds to change temperature of the cover stock.

There has now been discovered a new construction for the mold frame which has substantial advantage over the known mold frame having channels between adjacent rows of molds. In accordance with the present invention, the thermal medium itself is in direct contact with each mold throughout substantially the entire circumference thereof. This results in a much faster thermal response time. This has both economic and processing advantages. In particular, there is less metal to heat and cool, there can be more molds per unit area of mold frame, less heating and cooling are required for each operation and throughput time is substantially reduced.

These and other advantages of the present invention may be understood with reference to the drawings wherein.

Figure 1:
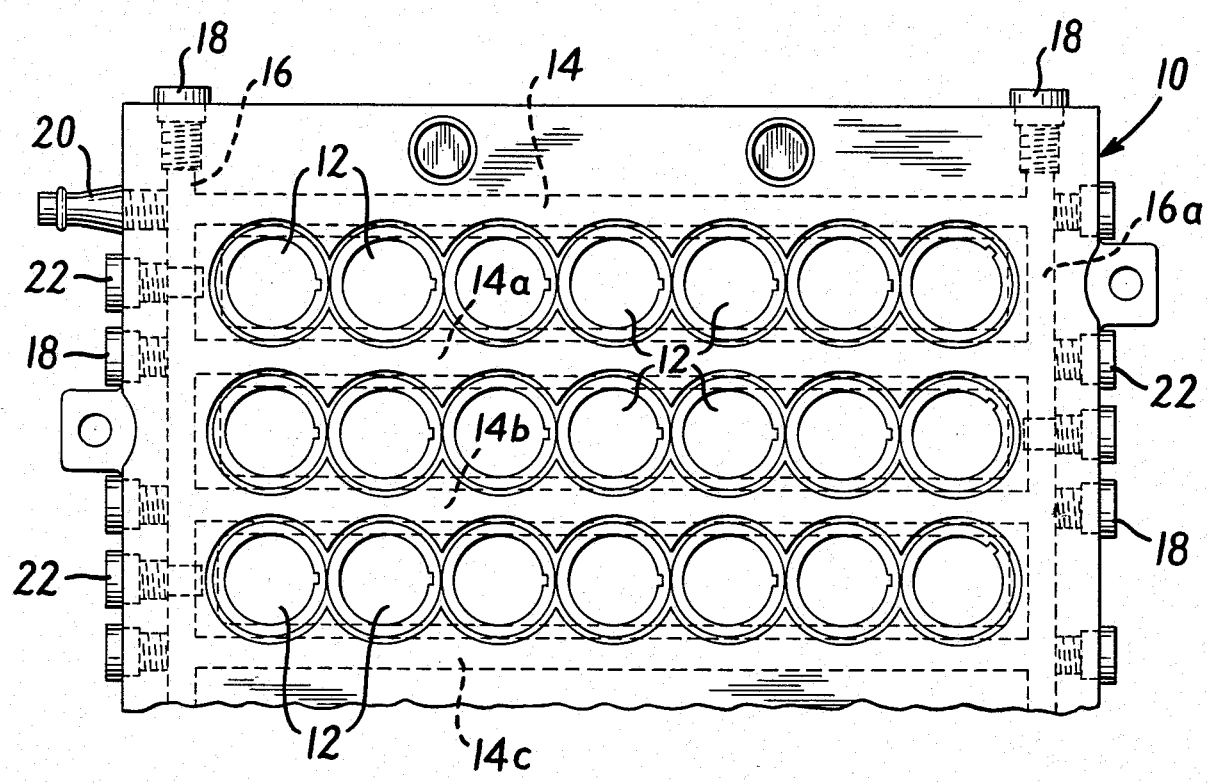
FIG. 1 is a top view of a prior art mold frame.

Referring first to FIG. 1, there is shown a standard mold frame such as is used for the compression molding of golf balls. The frame 10 is provided with a plurality of cavities 12 in which are secured standard golf ball half molds (not shown). Between each row of cavities 12 in the frame 10 is a bore 14, 14a, 14b, 14c. Bores 14, 14a, 14b, 14c are interconnected at the opposed ends of the frame by cross-bores 16, 16a. Each bore and cross-bore is respectively plugged at each end by a short threaded plug 18.

A thermal medium such a steam or cooling liquid, such as water, introduced through coupling 20 and withdrawn through a similar coupling (not shown), is passed through the bores 14, 14a, 14b, 14c in order to heat or cool the individual molds as desired. In order to have the flow of the thermal medium follow a serpentine series path through the mold frame, the cross-bores 16, 16a are selectively blocked by a plurality of longer threaded plugs 22 inserted into the cross-bores alternately between adjacent bores 14, 14a, 14b, 14c on the opposed sides as shown in FIG. 1.

In order to heat or cool the mold disposed in each individual cavity 12 it is necessary to heat or cool the mass of metal in the mold frame between the cavities 12 to the temperature of the thermal medium passing through the mold frame 10.

Figure 2:
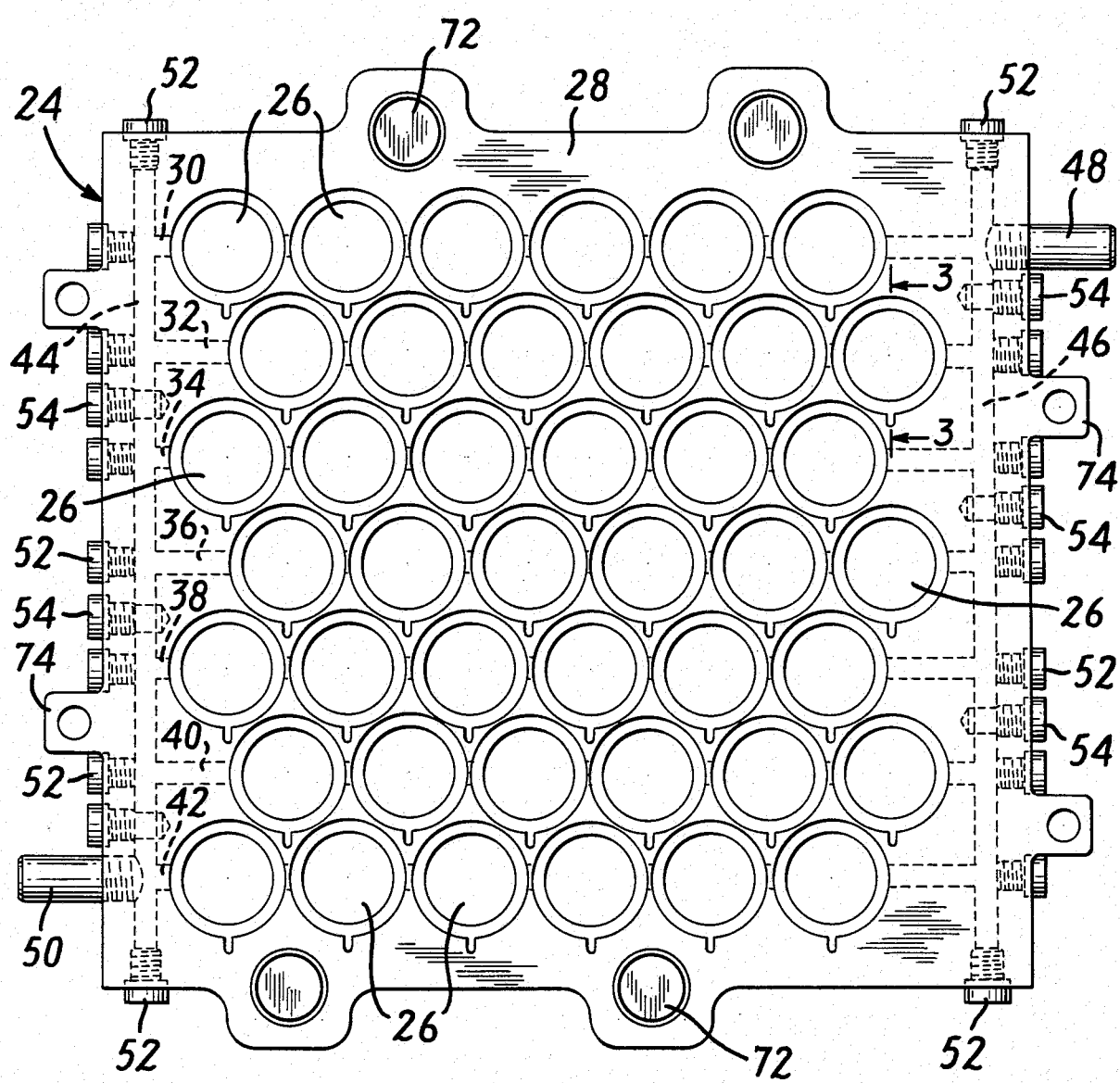
FIG. 2 is a top view of a mold frame according to the present invention.

In FIG. 2, a mold frame according to the invention is shown generally at 24. A plurality of cavities 26 for accommodating golf ball half molds (not shown) are disposed in a closely packed arrangement in a mold frame plate member 28. A closely packed arrangement is defined herein as one in which the distance between lines connecting the centers of the cavities in each row is less than 2 times the radius of the cavities. It is preferred that the spacing between rows of cavities be in the range of about 1.25 to about 1.375 times the radius of the cavities. It will be appreciated that other arrangements may be utilized, but the arrangement illustrated is preferred in order to take advantage of the fact that less space is required in a mold frame in accordance with the invention. The closely packed arrangement enables an increased number of balls to be molded in a press and mold of predetermined size, thus increasing productivity and reducing energy consumption. For example, if desired, 59 cavities may replace the 42 cavities in a conventional mold.

A plurality of bores 30, 32, 34, 36, 38, 40, 42 penetrate respectively through each row of cavities 26, thus forming channels for providing for fluid communication between each adjacent cavity 26 in the row. It will be appreciated that other interconnections may be incorporated, however the serial interconnection is preferred. Bores 30 through 42 are interconnected at the opposed ends of mold frame 28 by cross-bores 44 and 46.

An inlet 48 for receiving fluid is disposed at one end of bore 30 and an outlet 50 is disposed at the end of bore 42 on the opposite side from inlet 48. The remaining ends of each bore and cross-bore are respectively plugged by a plurality of short plugs 52 threadingly received therein. It will be appreciated that other means such as expansion plugs may be utilized for the purpose of sealing the ends of the bores.

Longer plugs 54 disposed alternately between adjacent bores on opposite sides of the plate serve to selectively block the cross-bores to create a serpentine series flow of the thermal medium through the adjacent cavities. It will be appreciated that other means such as a force fit plug may also be used to block fluid flow through the cross-bores if desired, however the longer threaded plugs are preferable.

Figure 3:
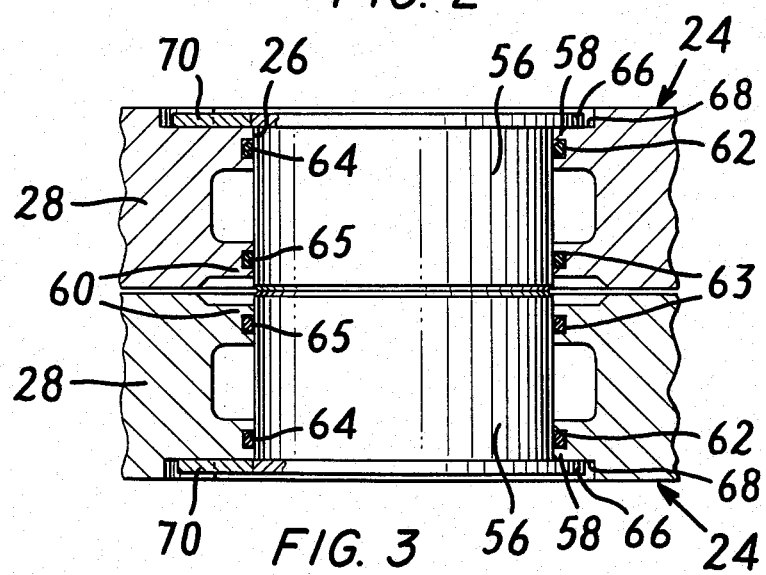
FIG. 3 is a partial cross-sectional view through line 3—3 of FIG. 2 illustrating the mold plates with molds in operational position.

FIG. 3 is a partial cross-section of a pair of mold plates having the half molds therein and in abutting engagement in the operational position for molding golf balls taken along the line 3—3 of FIG. 2. Since the plates are substantially identical, the reference numbers in the figure are identical for each.

As shown in FIG. 3, the mold plates 24 are held in opposing abutment during the molding operation. Half molds 56 are disposed in the cavity 26 to be held in opposed engaging abutment. One means for sealing against leakage of the thermal medium around the mold is shown. Annular lips 58 and 60 jut inwardly to overhang a larger diameter cavity portion therebetween which is interconnected to the adjacent cavities through the intersecting bore. An annular groove 62, 63 in each lip 58, 60 receives a resilient sealing member such as O-ring 64, 65.

The straight sides outer walls of the half molds 56 are sealingly received within the inner circumference of the O-ring 64. Annular lip 66 on the outer side of the half mold is received in recess 68 to prevent further penetration of the half mold. It will be appreciated that the sides of the cavity 26 can be constructed as a smooth wall and each half mold will have the corresponding O-rings and an annular groove therebetween on the half mold itself to create the channel for the medium to surround the mold. The construction illustrated in FIG. 3 is preferable, however, since the O-ring is protected during the insertion and removal of the half mold 56 and since the half mold requires less material for its construction.

If desired, a boss 70 in the lip 66 may be included for keying the half molds into the mold frame in the known manner. Further, registration pins 72 and mounting lugs 74 may be utilized as shown in FIG. 2 or, of course, may be disposed as desired.

The half molds 56 according to the invention are preferably made of brass or other high heat-conductivity metal so that the mold temperature may quickly come into equilibrium with the temperature of the thermal medium itself without the necessity for the lag time required for the mold frame itself to achieve the desired temperature. More importantly, the thermal interface which commonly exists between the metal of the mold frame and the mold cavity has been eliminated. The heating or cooling medium is in direct contact with the mold cavity surface. Thermal response delays associated with poor thermal conductivity between the mold frame and mold cavities are entirely eliminated. For example, a previous device requires approximately 5½ minutes for warmup whereas the mold plate according to the present invention requires approximately 30 seconds only.

It will be understood that the claims are intended to cover all changes and modifications of the preferred embodiments of the invention herein chosen for the purpose of illustration which do not constitute departures from the spirit and scope of the invention.

What is claimed is:

1. A mold frame for receiving a plurality of half molds comprising:
    (a) a frame plate member;
    (b) said plate member having a plurality of cavities therein, each cavity for receiving a replaceable half mold, each said half mold when received in said cavity defining a space between itself and the walls of the cavity;
    (c) said space surrounding said half mold; and
    (d) means operative to provide serpentine fluid communication between the spaces surrounding said half molds in said cavities, said fluid directly contacting each of said half molds.

2. The mold frame of claim 1 wherein said communication means are bores in said plate member which interconnect a plurality of said cavities.

3. The mold frame of claim 1 wherein said cavities are arranged in a plurality of rows and adjacent cavities in each row of said plurality of rows are interconnected by said communication means.

4. The mold frame of claim 3 wherein there is a plurality of communication means which are interconnected to each other.

5. The mold frame of claim 1 further comprising annular sealing means on the upper and lower portions of each said cavity for sealingly receiving said half mold and wherein said annular sealing means seals against leakage of a fluid introduced into the cavity portion between said seals whenever said half mold is received therein.

6. A mold plate comprising in combination a mold frame having a plurality of cavities therein and a plurality of half molds, each said cavity containing one said half mold, each said half mold being replaceable, each said half mold defining a space between itself and a wall of the cavity, each said space surrounding said half mold, said mold frame having means therein for providing serpentine fluid communication between said spaces surrounding said half molds, and for providing direct physical contact of the fluid with at least a portion of each said half mold.

7. The mold plate of claim 6 wherein said means for communicating a fluid comprises interconnecting bore means.

8. The mold plate of claim 6 further comprising sealing means at the upper and lower portions of each said cavity for sealing against fluid flow outwardly from the cavities and said means for communicating with each said cavity in the portion between said sealing means.

9. The mold plate of claim 8 wherein the sealing means are fixed on said frame in said cavities and each said half mold is in cooperating sealing abutment therewith.

10. The mold plate of claim 6 wherein the half molds are made of brass.

11. A mold plate for molding golf balls comprising in combination a mold frame having a plurality of cavities therein arranged in a plurality of closely packed rows, a plurality of half molds disposed respectively in said cavities, said half molds being adapted for compression molding of golf balls in said half molds being replaceable, annular sealing means at upper and lower portions of each said cavity of said mold frame, said annular sealing means in each cavity cooperating with said half mold disposed therein to form a sealed annular cavity portion between said upper and lower portions, bore means in said mold frame for interconnecting adjacent annular cavity portions in each of said plurality of rows and cross bore means for interconnecting the bore means, and means for selectively blocking the cross bore means whereby a serpentine fluid flow path through said bore means and said annular cavity portions is established when fluid travels through said bore and cross bore means.

12. A mold assembly comprising:
    (a) a mold plate having front and back surfaces;
    (b) a plurality of cavities in said front surface of the mold plate, the cavities being aligned in rows in at least one direction;
    (c) a bore interconnecting the cavities in each said row;

(d) the bore of the first and last rows being open to communication exteriorly of the mold assembly and the end of each other bore being in communication with the bore of one next adjacent row at one end of the bore and in communication with the other next adjacent row at the other end thereof whereby a serpentine path is created through the mold plate interconnecting the said cavities;

(e) a half mold in each said mold cavity, each said half mold being removable from said mold plate;

(f) said half mold being in fluid-tight seal with the cavity at the front surface of the mold plate, said half mold not completely filling said cavity on the sides of the half mold so that fluid can pass around each said half mold in said serpentine path;

(g) each said half mold being of brass.

13. The apparatus of claim 12 wherein said fluid-tight seal is effected by an O-ring engaged in an annular groove of the said cavity.

14. A mold plate, said mold plate comprising:
(a) front and back surfaces;

(b) a plurality of cavities in said front surface of the mold plate, the cavities being aligned in rows in at least one direction;

(c) a bore interconnecting the cavities in each said row;

(d) the bore of the first and last rows being open to communication exteriorly of the mold assembly and the end of each other bore being in communication with the bore of one next adjacent row at one end of the bore and in communication with the other next adjacent row at the other end thereof whereby a serpentine path is created through the mold plate interconnecting the said cavities;

(e) means for receiving a half mold in each said mold cavity, each said half mold being removable from said mold plate;

(f) means for maintaining each said half mold in fluid-tight seal with the cavity at the front surface of the mold plate, said half mold not completely filling said cavity on the sides of the half mold so that fluid can pass around each said half mold in said serpentine path.

* * * * *

UNITED STATES PATENT AND TRADEMARK OFFICE
CERTIFICATE OF CORRECTION

PATENT NO. : 4,508,309

DATED : April 2, 1985

INVENTOR(S) : Robert A. Brown

It is certified that error appears in the above–identified patent and that said Letters Patent are hereby corrected as shown below:

Column 4, line 48, after "balls", delete " in" and substitute therefor --,--.

Signed and Sealed this

Twenty-seventh Day of August 1985

[SEAL]

Attest:

DONALD J. QUIGG

*Attesting Officer*    *Acting Commissioner of Patents and Trademarks*